US007653878B1

(12) United States Patent
Russell

(10) Patent No.: US 7,653,878 B1
(45) Date of Patent: Jan. 26, 2010

(54) VISUALLY ORGANIZING AND HIGHLIGHTING A LIST OF ITEMS TO SHOW HOW THEY SATISFY MULTIPLE CRITERIA SELECTED BY A USER

(75) Inventor: John David Russell, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 683 days.

(21) Appl. No.: 10/044,457

(22) Filed: Jan. 11, 2002

(51) Int. Cl.
*G06F 3/00* (2006.01)
(52) U.S. Cl. .................. 715/748; 715/769; 715/765; 715/968; 715/749; 715/760; 715/840; 707/3; 707/4; 707/5
(58) Field of Classification Search ........... 715/764, 715/835, 840, 760, 765, 766, 708, 968, 748, 715/749; 707/3–5
See application file for complete search history.

(56) References Cited

U.S. PATENT DOCUMENTS

| | | | | | |
|---|---|---|---|---|---|
| 5,896,491 | A | * | 4/1999 | Englefield | 715/839 |
| 5,940,821 | A | * | 8/1999 | Wical | 707/3 |
| 6,111,574 | A | * | 8/2000 | Meek | 715/835 |
| 6,154,740 | A | * | 11/2000 | Shah | 707/7 |
| 6,253,367 | B1 | * | 6/2001 | Tran et al. | 717/108 |
| 6,256,649 | B1 | * | 7/2001 | Mackinlay et al. | 715/503 |
| 6,272,484 | B1 | * | 8/2001 | Martin et al. | 707/1 |
| 6,738,770 | B2 | * | 5/2004 | Gorman | 707/7 |
| 6,789,107 | B1 | * | 9/2004 | Bates et al. | 709/206 |
| 7,376,653 | B2 | * | 5/2008 | Hart, III | 707/10 |
| 2002/0023004 | A1 | * | 2/2002 | Hollander et al. | 705/22 |
| 2002/0032632 | A1 | * | 3/2002 | Sernet | 705/37 |
| 2003/0097377 | A1 | * | 5/2003 | Yahara et al. | 707/200 |
| 2003/0110227 | A1 | * | 6/2003 | O'Hagan | 709/206 |
| 2004/0260756 | A1 | * | 12/2004 | Forstall et al. | 709/200 |

OTHER PUBLICATIONS

EAST, User's Maual for the Examiners Automated Search Tool (EAST), Jul. 22, 1999, pp. 1-10.*

* cited by examiner

*Primary Examiner*—Ryan F Pitaro
(74) *Attorney, Agent, or Firm*—Hickman Palermo Truong & Becker LLP

(57) ABSTRACT

Techniques are described for displaying a list of items while simultaneously depicting how the items satisfy multiple criteria. A list of visual indicators is displayed in an order. The order indicates how the items satisfy a first criteria. For example, the list of items may be books displayed in alphabetical order. The order indicates how the titles rank alphabetically. While retaining the order, information is displayed to visually indicate how the items satisfy other criteria selected by the user. The user may select other criteria, and information is displayed to indicate how the items satisfy the other criteria. A page is downloaded by a browser on a client. The browser executing a page generates visual indications of how items satisfy the multiple criteria in response to user selection of the criteria.

24 Claims, 6 Drawing Sheets

```
410
       if (what=="Application development") {
           starIt ("a76939",what);
           starIt ("a76962",what);
           starIt ("a76965",what);
           starIt ("a76968",what);
           starIt ("a76995",what);
           starIt ("a77075",what);
           starIt ("a73729",what);
           starIt ("a85250",what);
           starIt ("a85436",what);
           starIt ("a87353",what);
           starIt ("a87567",what);
           starIt ("a88706",what);
           return false;
       }
```

PAGE ELEMENT 402

```
       if (what=="Books for new users") {
           starIt ("a84503",what);
           starIt ("a76962",what);
           starIt ("a76934",what);
           starIt ("a76715",what);
           starIt ("a34673",what);
           return false;
       }
```

PAGE ELEMENT 404

CODE 401

FIG. 4

VISUALLY ORGANIZING AND HIGHLIGHTING A LIST OF ITEMS TO SHOW HOW THEY SATISFY MULTIPLE CRITERIA SELECTED BY A USER

FIELD OF THE INVENTION

The present invention relates to user interfaces, and in particular, generating user interfaces that display information about a list of items.

BACKGROUND OF THE INVENTION

Use of the World Wide Web ("Web") to gain access to information and interact with other individuals and organizations is proliferating. Through the Web, mainstream users may obtain information about almost anything and procure an immense range of goods and services. The Web includes a network of servers on the Internet. The servers communicate by using the Hypertext Transfer Protocol (HTTP) with clients that are controlled by users, and deliver files referred to as "pages" to the clients. The pages typically contain code written in the Hypertext Markup Language (HTML). The code within a page may define a user interface, which is typically a graphical user interface ("GUI").

The pages are delivered to clients that request them. Typically, a client retrieves a page using a computer device that runs a client program, referred to as a browser. A browser is a combination of software and hardware that is capable of using the HTTP protocol to retrieve data from a server connected to the Web. When a browser running on a client receives a page containing code that conforms to HTML, the browser decodes the page. The HTML code may define a GUI. Thus, when a browser decodes a page, it generates the GUI. The user interacts with the GUI to enter data, such as text data entered through a keyboard, which the client transmits back to the server.

One of the long standing challenges for those who develop user interfaces is displaying multiple types of information about a large set of items within a single display in an effective way. For example, a user may access a page over a web to obtain information about a large set of books on a general topic. One type of information to display is the book name, another type of information is book categories, and the association between the books and the categories. The phrases "displayed in a page" and "displayed within a page" are used to conveniently express that information is displayed in the display area of a browser generated in response to decoding the page. Further, a page may be referred to as performing some action, such as displaying items of information. This too is a convenient way of expressing that the browser is performing the action in response to decoding or interpreting the page.

An approach that effectively presents multiple types of information about large sets of items in a single page may have the following traits. First, the page allows a user to select categories of interest and to display the items in a manner that visually associates the items with the categories of interest. Second, the items can be associated with multiple categories. The ability to associate items with multiple categories is important because, if an item can only be associated with one category, then whether or not a user can spot an item listed in a page may depend on the selection of the one category the user interface has associated with the item. Third, the GUI should quickly respond to user requests for information. Fourth, the information should be displayed in a non-intrusive manner to avoid cognitive overload, which can cause a user to "lose their place" or "train of thought."

The conventional systems for presenting large list of items in a page do not possess all these traits. One such conventional approach is the tree view approach. Under the tree view approach, categories are portrayed as nodes of branches in a graphical tree. To see items that belong to a particular category, a user selects the category, and the GUI expands that branch of the tree to display the items in the category. If there are more items in a category than can fit within the display of a page, then a user must interact with the browser to scroll down through the display of the list of items. As a result, the name of the category may "roll off" the display. Users may need to view the category because they may mentally lose track of what category they are currently viewing. Rather than simply shifting the focus of their eyes to a different location within the page to view the name of the category, a user must interact with the GUI to bring the category into view.

In some implementations of the tree view, only one category at a time may be expanded to display the items the category contains. Furthermore, expanding a branch may entail refreshing the browser, that is, reloading another page that displays the selected branch. Because the page may be reloaded over the network, access and display of the page is subjected to network delay.

Another conventional approach is to display search results using the dynamic web page approach. Under this approach, a browser executing code in a page elicits requests from a user to display items according to criteria selected by the user. In response to the request, the browser displays the information within the display of the browser. Information about the items is obtained by forming queries based on the user selected criteria, and then issuing queries over a network to a database server or other data source (e.g. web server). Query results are returned in response. The results are used to organize and highlight information about the set of items.

The dynamic web page approach has numerous disadvantages. The response between receiving a user request and displaying the information requested may be undesirably long for a variety of reasons. First, the response may be delayed by network congestion and processing needed to execute the query and generate the page. In some implementations of the dynamic web approach, a page is generated in response to each user request. Thus a response may be further delayed by the time needed to download another page to the borrower and display it. Furthermore, the database server may be inaccessible because of network problems or inability to cross a firewall.

Finally, other implementations of the dynamic web page approach may rely on client-side execution of Java. Such implementations depend on downloading a web page, a Java applet, and one or more data files. Security mechanisms implemented on most browsers that execute Java prevent access to data files that reside on the client.

Another conventional approach is the static web page approach. Static pages are created and stored at an HTTP server prior to a request from a browser for the page. In response to a request from a browser, a static HTML page is merely read from storage and transmitted to the requesting browser. Under the static web page approach, multiple static pages are generated, each showing a predetermined arrangement of information about a set of items. The disadvantages of this approach include the delay incurred in reloading and displaying the pages, and the storage space consumed to store pages representing different predetermined arrangements.

Based on the foregoing, it clearly desirable to provide a system for displaying multiple types of information about a large set of items in an effective way within a single page that avoids the pitfalls of a conventional system.

SUMMARY OF THE INVENTION

Techniques are provided for displaying a list of items while simultaneously depicting how the items satisfy multiple criteria. According to an aspect of the present invention, a list of visual indicators is displayed in an order. The order indicates how the items satisfy the first criteria. For example, the list of items may be books displayed in alphabetical order. The order indicates how the titles rank alphabetically.

While retaining the order, information is displayed to visually indicate how the items satisfy other criteria selected by the user. The user may select other criteria, and information is displayed to indicate how the items satisfy the other criteria. For example, the other criteria may be whether books belong to particular categories. In response to a user selecting a category, icons are displayed next to the visual indicators of books that belong to the category.

According to another aspect of the present invention, a page is downloaded by a browser on a client. The browser executing a page generates visual indications of how items satisfy the multiple criteria in response to user selection of the criteria. The code in the page causes the browser to execute in this way.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram depicting page elements generated to implement an embodiment of the present invention.

DETAILED DESCRIPTION OF THE INVENTION

A method and apparatus is described for highlighting a list of items to visually indicate how the items satisfy multiple criteria. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Exemplary Architecture

Figure 1:
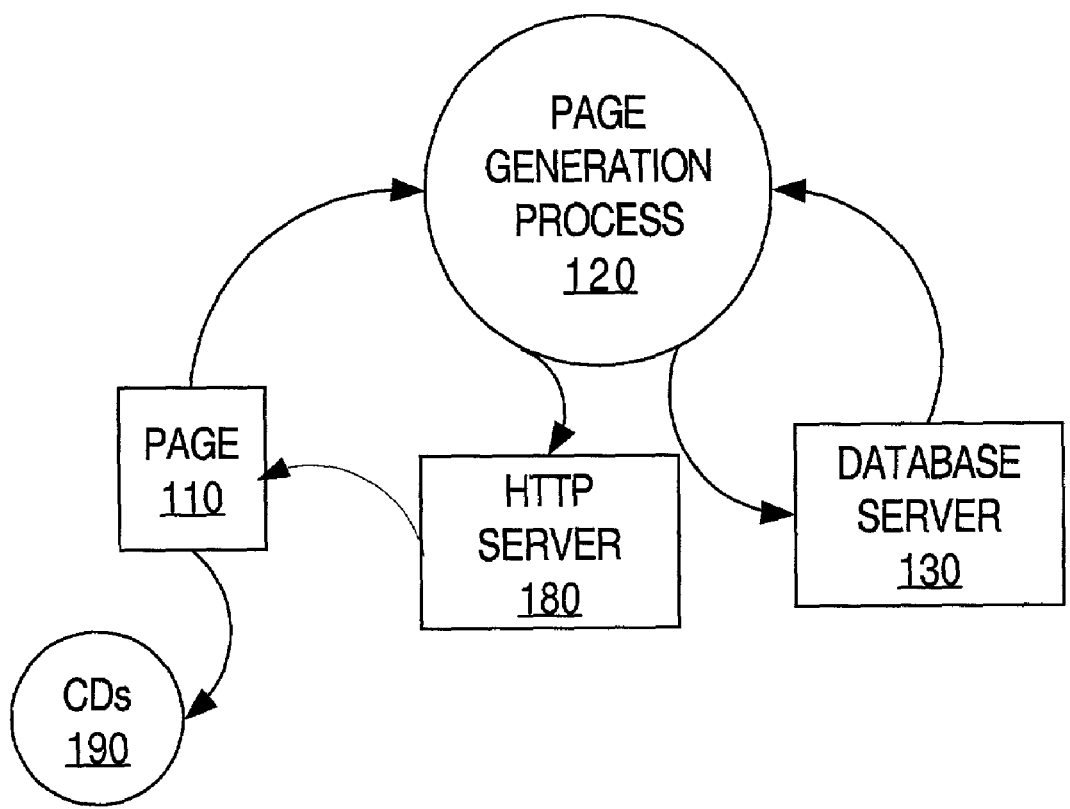
FIG. 1 is a block diagram depicting entities that participate in the generation and use of pages created according to an embodiment of the present invention.

FIG. 1 is a block diagram showing an exemplary architecture for "highlighting" how items satisfy multiple-criteria.

"Highlighting an item" refers to generating a visual indication that emphasizes the display of one or more items. Likewise, "highlighting a criterion" refers to highlighting the display of items in a way that indicates how the items satisfy a criterion.

Referring to FIG. 1, page generation process 120 is a process running a computer that generates pages, such as page 110. The pages are configured to simultaneously depict how a set of items satisfy multiple criteria selected by a user. In addition, the pages are configured to elicit user input to select a particular criterion. In response to receiving user input indicating a particular criteria, the page "dynamically highlights" items that satisfy the criterion. "Dynamically highlighting items" or "dynamically highlighting criterion" refers to highlighting items and criterion in response to a user selecting the criterion. An item may be highlighted, without limitation, by displaying it in a prominent hue, or by displaying an icon or text next to the display of an item.

An item may be any entity that can be modeled by data. These include, for example, books, hotels, magazines, consumer products, and documents. The present invention is not limited to highlighting any particular type of item or information.

Page generation process 120 generates pages based on information about the items obtained from database server 130. The information is extracted through the use of queries. For a particular criterion that may be selected by a user, page generation process 120 issues a query to database server 130 requesting information about the items that satisfy the criterion. Based on the results returned by database server 130, page generation process 120 configures the page to dynamically highlight the items that satisfy the criterion.

Once generated by page generation process 120, page 110 may be stored as a static page, where HTTP server 180 may download it to browsers requesting it. Alternately, page 110 may be copied onto compact disc 190.

Illustrative Page

Figure 2A:
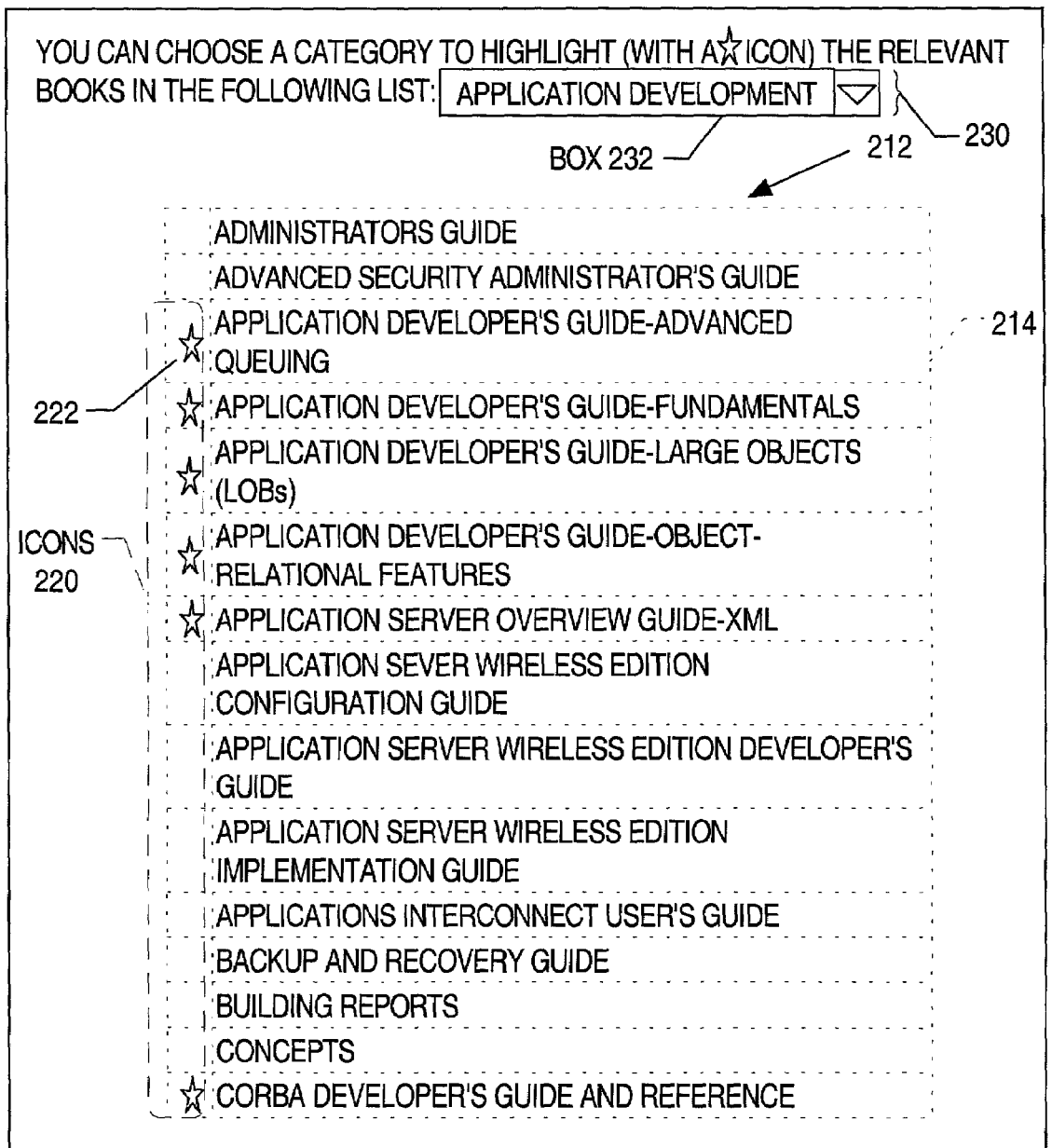
FIG. 2A is a diagram depicting a page image of a page displaying a list of items in a way that visually indicates how the items satisfy multiple criteria according to an embodiment of the present invention.

FIG. 2A is a diagram showing page image 210, a display generated by page 110 to dynamically highlight how a set of books satisfy multiple criteria. Referring to FIG. 2A, list of links 212 contains a type of graphical control referred to as a "link". Each link from list of links 212 describes a particular book, and each link may be manipulated by a user (e.g. by clicking with a mouse) to download a page for further processing with respect to the particular book. For example, link 214 describes a book entitled "Application Developers Guide—Advanced Queuing". When a user manipulates link 214, a page is downloaded to access functionality for viewing more information about the book, or for ordering the book.

Select box 230 is a list box having as selections book categories and subcategories of books. A user may manipulate list box 230 to select a particular category. The selected category is displayed within box 232. Box 232, as depicted in FIG. 2A, shows that the currently selected category is "Application Development".

Page 210 visually indicates how the books satisfy several criteria. First, page 100 highlights items that belong to the current selection in select box 230, book category "Application Development", by displaying icons 220 next to the links for those books. Icon 222 is positioned adjacent to link 214 to indicate that the book entitled "Application Developers Guide—Advanced Queuing" belongs to the category "Application Development".

Second, list of links 212 are arranged in alphabetical order. Thus, page 110 visually indicates how books are ranked according to ranking criterion that is based on the alphabetic order of the books title.

To dynamically highlight books that belong to another criteria, a user may manipulate list box 230 to select the other category. For example, a user may wish to see what books belong to the category "Books for new users". A user manipulates list box 230 to select the category. In response, icons are displayed to highlight the books that belong to the category.

Figure 2B:
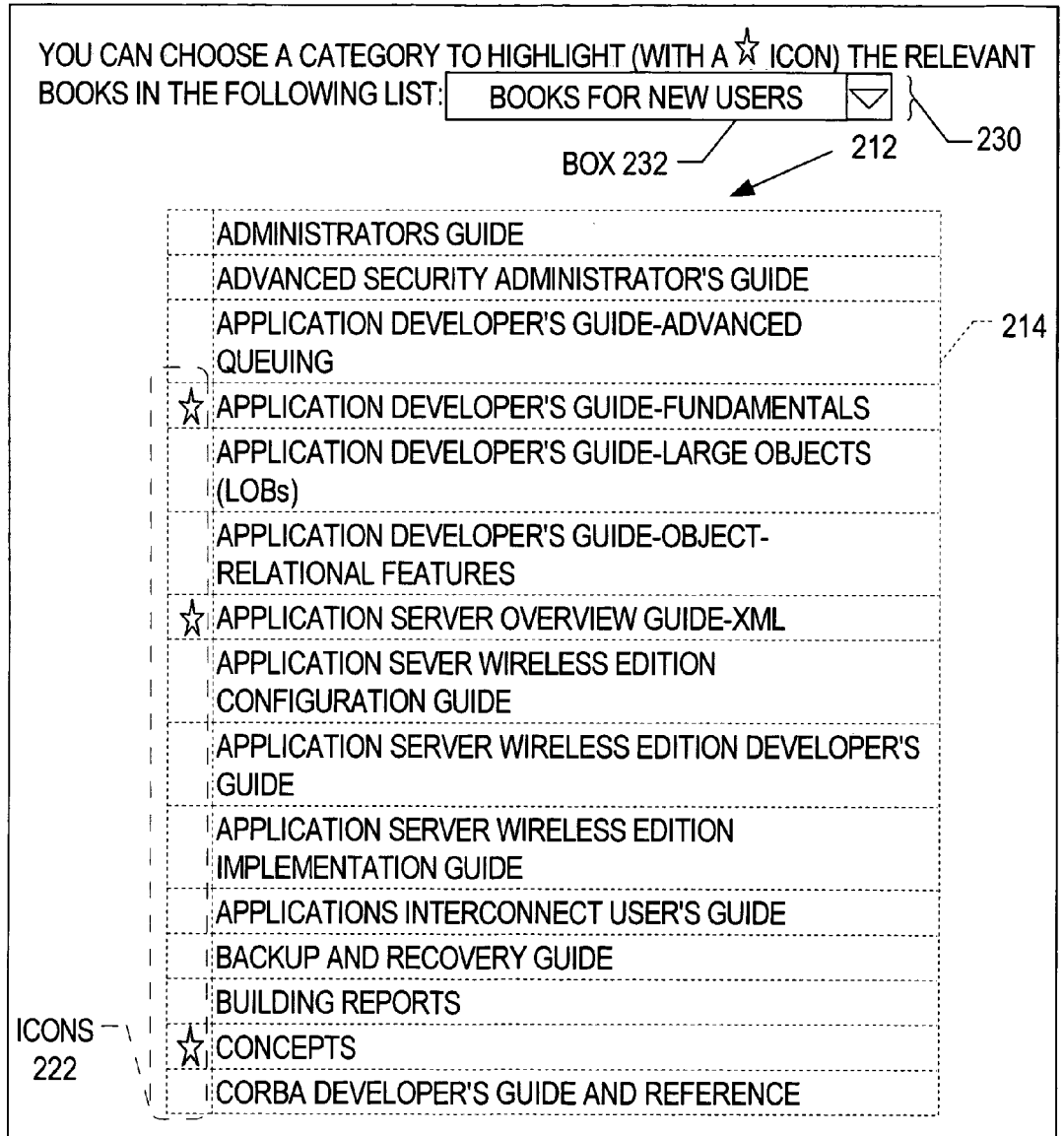
FIG. 2B is a diagram depicting a page image displayed for the page to visually indicate how items satisfy another criteria according to an embodiment of the present invention.

FIG. 2B is a diagram that depicts page image 216, which is generated by page 110 to highlight items that belong to the category "Books for new users". Each of icons 224 is displayed adjacent to a link associated with the book to visually indicate that the book belongs to the category.

Self-Contained Pages

Page 110 contains the code and data needed to cause the browser to display icons 224 in response to user selection of a category without having to download another page. Because page 100 can cause the browser to respond in this way, page 110 is referred to as being "self-contained". The term "self-contained" refers to several properties of page 110. First, page 110 contains code for causing a browser to dynamically highlight criteria. There is no need to load another page or file containing other code to dynamically highlight the criteria. For example, the browser does not need to load another page containing HTML code or one or more files containing Java code. Second, if the page and one or more data files referenced by the page reside on the client, there is no need to download additional data files from a server. Examples of such data files include, without limitation, a bitmap file defining an icon image used to highlight items.

Generating a Page

Figure 3:
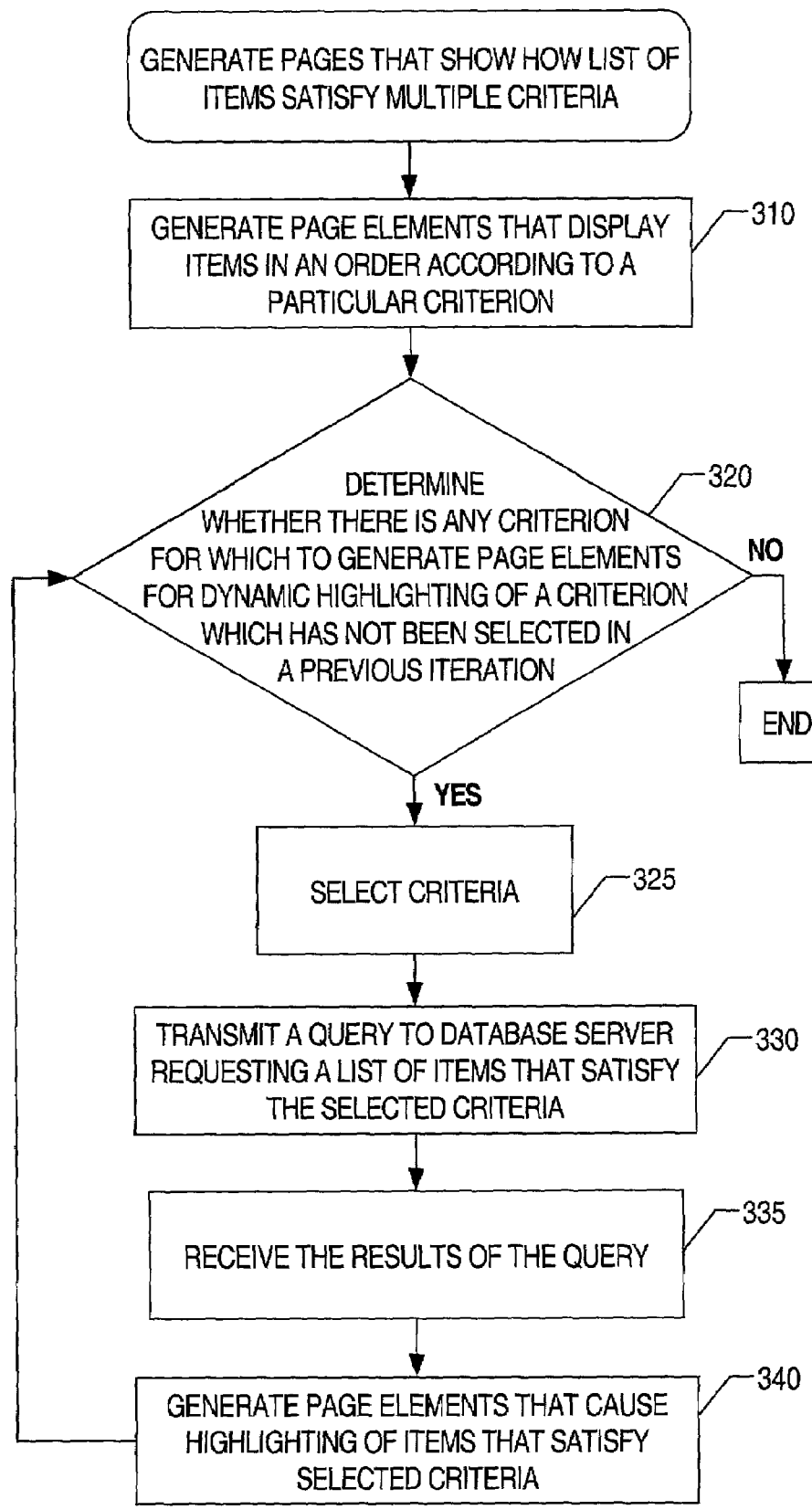
FIG. 3 is a flow chart depicting a process for creating pages configured according to an embodiment of the present invention.

FIG. 3 shows a flowchart depicting an illustrative process for generating page elements for a page 110. The term "page element" refers to code and data elements that conform to a computer language syntax. Such languages include, without limitation, the hypertext markup language ("HTML"), JavaScript, and the extensible mark-up language ("XML"). Page elements include, without limitation, code elements that define forms, links, tables, icons, list boxes, methods written in JavaScript, and method invocations. JavaScript is a scripting language that may be interpreted by a browser upon the occurrence of events. Such events include, for example, selecting a selection in a list box.

The process shown in FIG. 3 generates page elements that cause the highlighting of a set of items according to various particular criteria. However, such pages contain other types of page elements to perform other tasks needed for dynamic highlighting or for other purposes. These include, without limitation, page elements that define list box 230, or a link to a "help" page.

At step 310, page generation process 120 generates the page elements that display items in an order according to a particular criteria. For example, the step could involve a process in which page generation process 120 creates HTML code that defines rows of a table (herein "book table"). Each row corresponds to a book, and contains cells. The rows are ordered within the table according to the title of the book.

For a particular row, one cell defines a link from list of links 212. Another cell contains a "display object" with an "image attribute." The display objects are used to display icons. Specifically, the image attribute may be set to the image of an icon, such as icon 222. This causes the browser to display the icon within the cell that contains the object. Or, the attribute may be set so that nothing is displayed for the object at all.

Steps 320 through 340 form a loop where each iteration of the loop generates page elements. For each iteration, the page elements generated cause the display of an icon adjacent to the links associated with items that satisfy the particular criterion. The criterion is part of a larger set of criteria. The set of criteria may be any criteria for which dynamic highlighting is desired according to the approaches described herein. For example, the set of criteria may be whether or not books belong to particular categories. The page elements generated in each iteration may cause an icon to be displayed next to the link of a book that belongs to particular categories.

At step 320, page generation process 120 determines whether there is any criterion, for which to generate page elements for dynamic highlighting of the criterion, which has not been selected in a previous iteration. At step 325, a criterion is selected.

At step 330, page generation process 120 transmits a query to database server 130 requesting a list of items that satisfy the selected criteria. In the current example, page generation process 120 issues a query requesting results that contain records of books that belong to a particular category.

At step 335, page generation process 120 receives the results of the query.

At step 340, page generation process 120 generates page elements that, when a user selects a criterion, cause highlighting of items that satisfy the user selected criterion. Page elements that may be generated in this step are shown in FIG. 4.

Referring to FIG. 4, it shows code 401. Code 401 is part of an implementation of a method written in JavaScript that is invoked upon the occurrence of a selection event, an event where a user selects a selection from list box 230. Code 401 includes page elements 402 and 404. Page element 402 defines a block of code that is executed when the selection is the category "Application development". Likewise, page element 402 defines a block of code that is executed when the selection is the category "Books for new users".

Page element 402 includes multiple invocations of the method starIt. The method sets the image attribute of a display object to the image of the icon. For example, Line 410 contains an invocation of starIt that causes an icon to be displayed for a row for the book identified by the first parameter value of "a76939". The parameter represents a catalogue number of a book. Each display object in the book table has a catalogue number attribute set to the catalogue number of the book corresponding to the row in which the display object resides. The method starIt will set the image attribute of the display object identified by the first parameter to the icon image.

The second parameter of starIt is a string that is displayed as help text by the browser. The browser displays help text when a cursor is placed over the display of an image generated for a display object.

When a new selection from a list box is picked, the list box may already be set to a "current" criteria selected previously. Because the current criteria is also being highlighted by page 110, the highlighting should be removed for items that do not satisfy the newly selected criteria. Typically, selecting a new selection when there is a current selection generates two events—a selection event for selecting a new selection and a deselection event for deselecting the current selection. The highlighting that needs to be removed can be removed by executing a method triggered by the de-selection event. Page elements that are executed upon the occurrence of a deselection event to hide icons displayed for the de-selected criterion may be also be generated at step 340.

Advantages

The various approaches described herein have numerous advantageous. First, a list of items can be visually ordered according to one criteria (e.g. alphabetic, smallest to largest) while information about how the items satisfy multiple other criteria can be simultaneously displayed. Thus, information about how the items satisfy the criteria can be provided without having to sacrifice an effective way of visually indexing items. Furthermore, the user may easily ascertain relationships between the dynamically highlighted criteria and ordering criterion. For example, a user may easily detect that icons displayed for the category "Very large databases" are displayed for books that have a title that begins with "Oracle Real Application Clusters". A user's viewpoint is maintained because the order of items listed is retained and the visual information presented is not drastically changed.

In response to user selection of criteria, items are dynamically re-highlighted without having to re-load a page, or otherwise re-display or re-order the list of items. For practical purposes, items are re-highlighted instantly. Information about the relationship between items and multiple criteria is available in an instant. In systems where such information is not so readily available, users tend to rely on recollection to track the relationships. However, with approaches described herein, a user may simply rely on recognition of relationships because they may be depicted in an instant.

Items can be represented as belonging to multiple criteria. Selecting a particular criterion does not remove an item from view as in, for example, an implementation of the tree view approach discussed previously.

Because a self-contained page may be used to dynamically highlight items, there is no need to use the network to load additional HTML files or Java applets. Reliance and dependency on the network and network conditions is reduced. In fact, there is no need to maintain a network connection or connection to a database server to dynamically highlight items. Execution of a self-contained page does not require such connections.

Alternate Embodiments

The approaches for highlighting how items satisfy multiple criteria have been illustrated using various embodiments. However, the present invention is not limited to these embodiments. Examples of such alternate embodiments are described below, without limitation.

The present invention is not limited to using a single icon to indicate whether items satisfy a criteria. For example, one or more icons may be displayed to indicate how relevant a book is to a particular category. Books that have the highest relevance are highlighted with three icons, books with lowest relevance are highlighted with one icon. Alternatively, books relevant to a category may be highlighted with numerical ratings indicating the degree of relevance to a particular category. Relevance may also be indicated by changing the visual appearance of an entry. For example, books with greater relevance to the currently selected category may be displayed in bright colors or high contrast, while entries for less relevant books may be displayed in darker or low contrast colors.

The present invention was illustrated using a process of determining what items satisfy criteria by issuing queries to a database. However, the present invention is not limited to using such a process for determining how items satisfy a criteria. For example, books may be stored in the files of a hierarchical file directory system. The hierarchy is organized according to book categories. The category to which a book belongs may be determined by examining the directory in which the book's file resides. Alternatively, the determination of the categories to which a book belongs may be determined by examining the contents of the file for the book.

Hardware Overview

Figure 5:
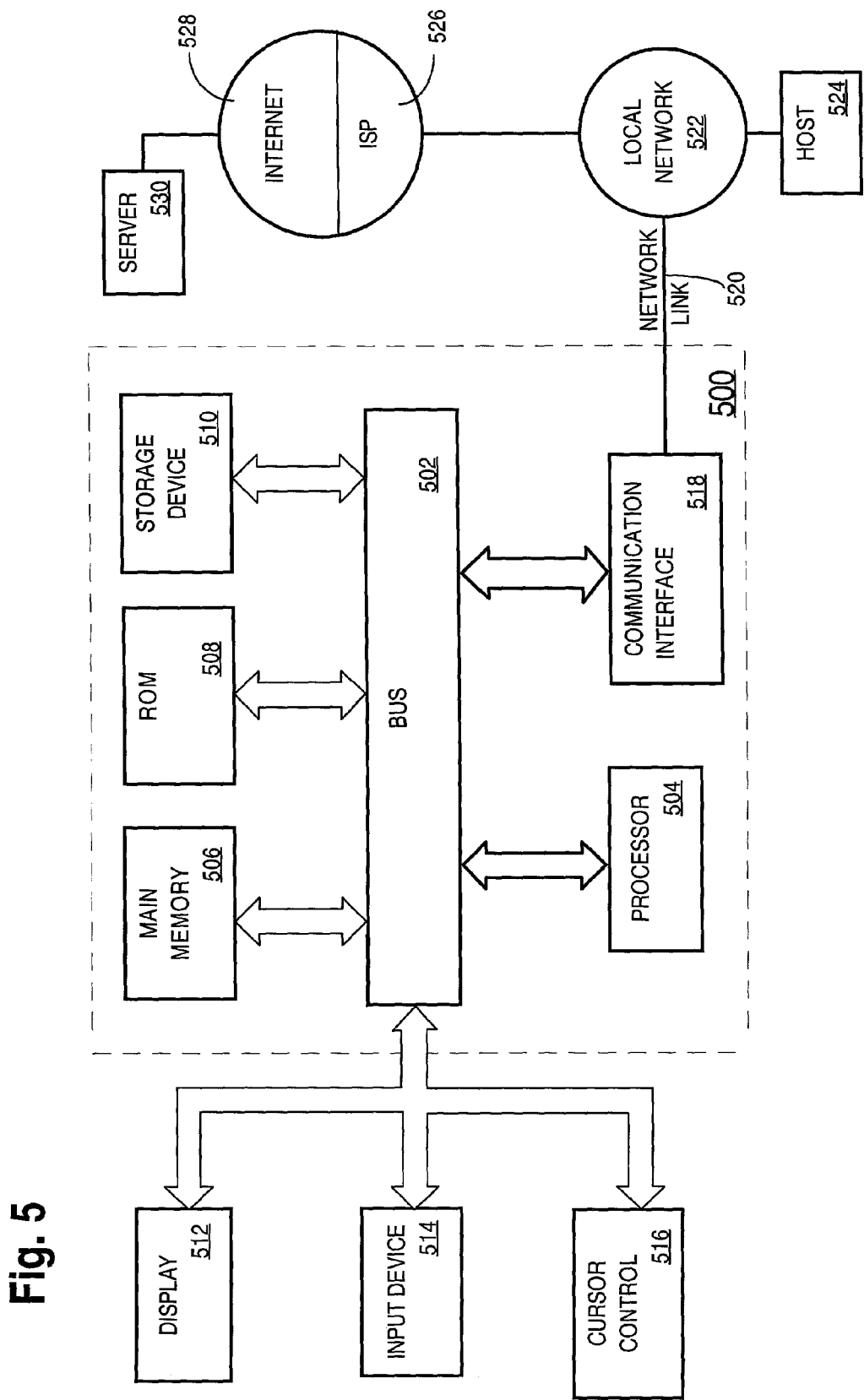
FIG. 5 is a block diagram of a computer system that may be used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of depicting a plurality of items and how said plurality of items satisfy multiple criteria, the method comprising the computer-implemented steps of:
   a web browser receiving a self-contained web page; and
   in response to executing said self-contained web page, said web browser performing the steps of:
      generating a display of a list of visual indicators in a particular order, wherein the particular order indicates how said plurality of items satisfy one or more first criteria;
      detecting input indicating the selection of one or more second criteria;
      in response to detecting said input, determining, without said web browser having to interact over a network with a web server, how said plurality of items satisfy the one or more second criteria; and
      while retaining said list of visual indicators in said particular order within said display, displaying a visual indication of how said plurality of items satisfy the one or more second criteria.

2. The method of claim 1, wherein the step of the web browser receiving the self-contained web page includes the web browser receiving the self-contained web page over the network from the web server.

3. The method of claim 1, wherein the step of the web browser receiving the self-contained web page includes said web browser causing said self-contained web page to be read from removable computer-readable storage media.

4. The method of claim 1, wherein the step of displaying a visual indication includes displaying one or more other visual indicators visually associated with a subset of items that satisfy said one or more second criteria.

5. The method of claim 1, wherein the step of displaying a visual indication includes altering the visual appearance of one or more visual indicators from said list of visual indicators.

6. The method of claim 1, wherein
   said one or more first criteria is based on an alphabetic order of names associated with said plurality of items; and
   the particular order of the list of visual indicators indicates the alphabetic order of the name of the items.

7. The method of claim 1, wherein:
   the step of detecting input indicating the selection of one or more second criteria includes detecting input selecting a particular category of a plurality of categories; and
   the step of displaying a visual indication of how said plurality of items satisfy the one or more second criteria includes displaying a visual indication of which items of said plurality of items belong to said particular category.

8. The method of claim 7, wherein said step of detecting input selecting a particular category includes detecting that a user has selected said particular category as a selection in a list box listing said plurality of categories as selections.

9. The method of claim 1, wherein the steps further include:
   detecting input indicating the selection of one or more third criteria; and
   while retaining said list of visual indicators in said particular order within said display, displaying a visual indication of how said plurality of items satisfy said one or more third criteria, wherein said one or more third criteria is different from said one or more second criteria.

10. A method of generating a web page that causes a web browser to depict a plurality of items and how said plurality of items satisfy multiple criteria, the method comprising the computer-implemented steps of:

generating first web page elements that cause said web browser to display in a particular order a list of visual indicators, wherein the particular order indicates how said plurality of items satisfy one or more first criteria;

generating one or more second web page elements that enable the web browser to receive user input indicating a selection of one or more criteria of a plurality of criteria;

generating third web page elements that enable the web browser to determine, in response to the web browser receiving the user input, how said plurality of items satisfy the one or more criteria; and generating fourth web page elements that cause the web browser to display, for each particular criterion of the one or more criteria, a visual indication of how said plurality of items satisfy said particular criterion, without changing said particular order.

11. The method of claim 10, wherein:

the steps further include issuing a query to a database system that stores information about said plurality of items, wherein said query requests data that is used to determine which set of items of said plurality of items satisfy a first criterion of said plurality of criteria;

receiving results of the query from the database system; and wherein the step of generating third web page elements is based on an examination of the results.

12. The method of claim 10, wherein the steps further include:

performing an examination of contents of said plurality of items to determine which of said plurality of items satisfy the one or more criteria of said plurality of criteria;

wherein the step of generating third web page elements is based on said examination of the contents.

13. One or more storage media storing instructions for depicting a plurality of items and how said plurality of items satisfy multiple criteria, wherein the instructions, when processed by one or more processors, cause:

a web browser receiving a self-contained web page; and in response to executing said self-contained web page, said web browser performing the steps of:

generating a display of a list of visual indicators in a particular order, wherein the particular order indicates how the plurality of items satisfy one or more first criteria;

detecting input indicating the selection of one or more second criteria;

in response to detecting said input, determining, without said web browser having to interact over a network with a web server, how said plurality of items satisfy the one or more second criteria; and while retaining said list of visual indicators in said particular order within said display, displaying a visual indication of how said plurality of items satisfy the one or more second criteria.

14. The one or more storage media of claim 13, wherein the step of the web browser receiving the self-contained web page includes the web browser receiving the self-contained web page over the network from the web server.

15. The one or more storage media of claim 13, wherein the step of the web browser receiving the self-contained web page includes said web browser causing said self-contained web page to be read from removable computer-readable storage media.

16. The one or more storage media of claim 13, wherein the step of displaying a visual indication includes displaying one or more other visual indicators visually associated with a subset of items that satisfy said one or more second criteria.

17. The one or more storage media of claim 13, wherein the step of displaying a visual indication includes altering the visual appearance of one or more visual indicators from said list of visual indicators.

18. The one or more storage media of claim 13, wherein:

said one or more first criteria is based on an alphabetic order of names associated with said plurality of items; and the particular order of the list of visual indicators indicates the alphabetic order of the name of the items.

19. The one or more storage media of claim 13, wherein:

the step of detecting input indicating the selection of one or more second criteria includes detecting input selecting a particular category of a plurality of categories; and the step of displaying a visual indication of how said plurality of items satisfy the one or more second criteria includes displaying a visual indication of which items of said plurality of items belong to said particular category.

20. The one or more storage media of claim 19, wherein said step of detecting input selecting a particular category includes detecting that a user has selected said particular category as a selection in a list box listing said plurality of categories as selections.

21. The one or more storage media of claim 13, wherein the instructions include additional instructions which, when executed by the one or more processors, further cause:

detecting input indicating the selection of one or more third criteria; and while retaining said list of visual indicators in said particular order within said display, displaying a visual indication of how said plurality of items satisfy said one or more third criteria, wherein said one or more third criteria is different from said one or more second criteria.

22. One or more storage media storing instructions for generating a web page that causes a web browser to depict a plurality of items and how said plurality of items satisfy multiple criteria, wherein the instructions, when executed by one or more processors, cause:

generating first web page elements that cause said web browser to display in a particular order a list of visual indicators, wherein the particular order indicates how said plurality of items satisfy one or more first criteria;

generating one or more second web page elements that enable the web browser to receive user input indicating a selection of one or more criteria of a plurality of criteria;

generating third web page elements that enable the web browser to determine, in response to the web browser receiving the user input, how said plurality of items satisfy the one or more criteria; and generating fourth web page elements that cause the web browser to display, for each particular criterion of the one or more criteria, a visual indication of how said plurality of items satisfy said particular criterion, without changing said particular order.

23. The one or more storage media of claim 22, wherein the instructions include additional instructions which, when executed by the one or more processors, further cause:
- issuing a query to a database system that stores information about said plurality of items, wherein said query requests data that is used to determine which set of items of said plurality of items satisfy a first criterion of said plurality of criteria; and
- receiving results of the query from the database system;
- wherein the step of generating third web page elements is based on an examination of the results.

24. The one or more storage media of claim 22, wherein the instructions include additional instructions which, when executed by the one or more processors, further cause:
- performing an examination of contents of said plurality of items to determine which of said plurality of items satisfy the one or more criteria of said plurality of criteria;
- wherein the step of generating third web page elements is based on said examination of the contents.

* * * * *

UNITED STATES PATENT AND TRADEMARK OFFICE
CERTIFICATE OF CORRECTION

| | | |
|---|---|---|
| PATENT NO. | : 7,653,878 B1 | Page 1 of 1 |
| APPLICATION NO. | : 10/044457 | |
| DATED | : January 26, 2010 | |
| INVENTOR(S) | : John David Russell | |

It is certified that error appears in the above-identified patent and that said Letters Patent is hereby corrected as shown below:

Title page, item (*) Notice: should read as follows:   Subject to any disclaimer, the term of this patent is extended or adjusted under 35 U.S.C. 154(b) by 968 days.

On the title page, item (56), in column 1, under "Other Publications", line 1, delete "Maual" and insert -- Manual --, therefor.

Signed and Sealed this

Fourteenth Day of September, 2010

David J. Kappos
*Director of the United States Patent and Trademark Office*